United States Patent [19]

Collins et al.

[11] 4,203,794
[45] May 20, 1980

[54] VARIABLE WIDTH TIRE BUILDING DRUM WITH INTERDIGITATED SHOES

[75] Inventors: Marcus H. Collins, Akron; John K. Smith, Parma, both of Ohio

[73] Assignee: Eaton Corporation, Cleveland, Ohio

[21] Appl. No.: 954,516

[22] Filed: Oct. 25, 1978

[51] Int. Cl.² .................................................. B29H 17/16
[52] U.S. Cl. ..................................... 156/415; 156/417
[58] Field of Search .................................. 156/414–420

[56] References Cited

U.S. PATENT DOCUMENTS

| | | | |
|---|---|---|---|
| 1,860,342 | 5/1932 | Heston | 156/415 |
| 2,653,645 | 9/1953 | Frazier | 156/419 |
| 3,077,917 | 2/1963 | Appleby | 156/416 |
| 3,160,546 | 12/1964 | Burton | 156/415 |
| 3,467,567 | 9/1969 | Woodhall | 156/416 |
| 3,492,184 | 1/1970 | Brey et al. | 156/414 |
| 3,503,829 | 3/1970 | Menell et al. | 156/416 |
| 3,526,561 | 9/1970 | Benns | 156/416 |
| 3,867,231 | 2/1975 | Casey | 156/415 |
| 3,948,717 | 4/1976 | Suzuki et al. | 156/417 |

FOREIGN PATENT DOCUMENTS

| | | | |
|---|---|---|---|
| 67115 | 11/1965 | Australia | 156/414 |
| 2522798 | 12/1975 | Fed. Rep. of Germany | 156/415 |

*Primary Examiner*—John E. Kittle
*Attorney, Agent, or Firm*—R. J. McCloskey; M. L. Union

[57] ABSTRACT

An annular tire building drum having an infinitely variable width for use in a tire building machine includes a hub rotatable about an axis of rotation and an annular fluid expandable tube supported on the hub. The tube includes support means disposed on the exterior surface thereof. A plurality of pairs of shoe members are supported on the support means for movement in a radial direction upon expansion and contraction of the tube. The shoe members define an annular tire building surface. One of the shoe members of each pair of shoe members is movable in a first direction parallel to the axis of rotation and the other shoe member of each pair is movable in a second direction opposite the first direction to infinitely vary the axial width of the building surface. The support means includes guideway means and each of the shoe members includes a guide member attached thereto. The guide members are received in the guideway means and cooperate therewith to prevent movement of the shoe members in a radial direction relative to the support means and provide for relative movement in a direction parallel to the axis of rotation between the shoe members and the support means.

18 Claims, 5 Drawing Figures

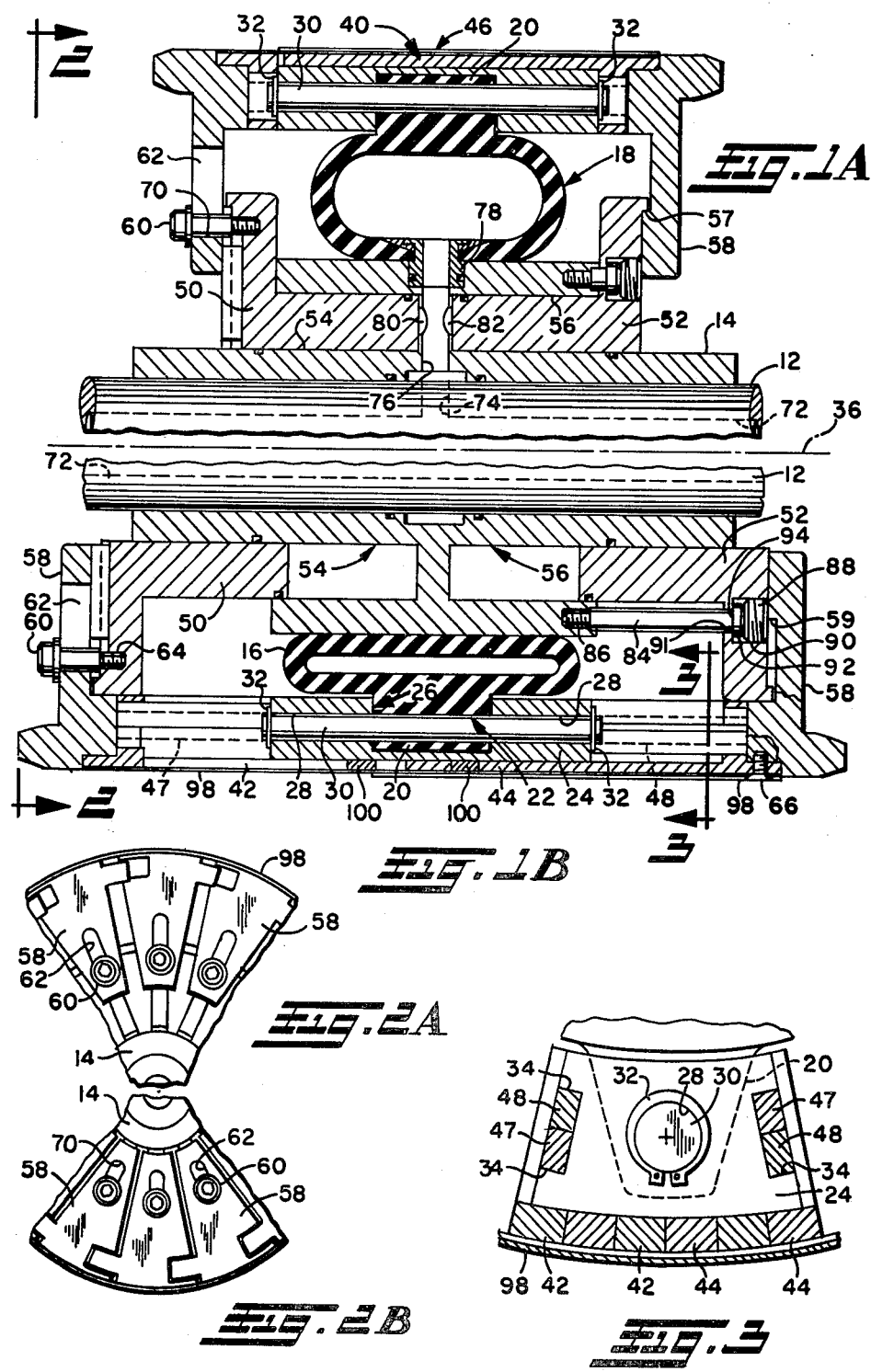

VARIABLE WIDTH TIRE BUILDING DRUM WITH INTERDIGITATED SHOES

BACKGROUND OF THE INVENTION

Field of the Invention

The present invention relates to a fluid expandable drum for building portions of tires thereon and more particularly to a fluid expandable drum whose width is infinitely variable to enable the tire building drum to be utilized to build tires of various widths. The width of the tire building drum is controlled by a pair of interdigitated shoe members which move in a direction parallel to the axis of rotation of the drum to expand the width of the tire building surface. The shoe members are supported by support means disposed on the exterior surface of the tube element which provides for movement of the shoe members in a direction parallel to the axis of rotation and which prevents movement of the shoe members in a radial direction relative to the support means and the exterior surface of the tube element.

The tire building drums including a fluid expandable tube element for expanding and contracting the diameter of a tire building surface are known in the art. The Woodhall U.S. Pat. No. 3,467,567 is an example of such a machine where the diamenter of the building surface can be varied but the width of the building surface is fixed. It is also known to provide a building surface which can vary in width to facilitate the removal of a built tire therefrom. Such a machine is disclosed in the Heston U.S. Pat. No. 1,860,342 wherein a fluid actuatable piston is utilized to decrease the width of the tire building surface to facilitate the removal of a built tire portion therefrom. Heston does not provide a variable width building surface. Other prior art, not illustrated, discloses adding or subtracting drum segments to incrementally vary the width of the drum depending on the number of drum segments utilized. It is desirable to provide a tire building surface whose width taken parallel to the axis of rotation of the tire drum is infinitely variable and variable in response to fluid pressure to thereby control the width of the tire building surface.

SUMMARY OF THE INVENTION

The present invention provides a new and improved annular tire building drum having an infinitely variable width including a hub portion supportable for rotation about an axis of rotation and an annular fluid expandable tube element supported on the hub portion. The tube element includes support means disposed thereon for movement therewith. A plurality of pairs of shoe members are supported by the support means for movement therewith in a radial direction upon expansion and contraction of the tube element. One of the shoe members of each pair is movable in a first direction parallel to the axis of rotation and the other of the shoe members of the pair is movable in a second direction opposite the first direction to infinitely vary the axial width of the building surface. The support means include guideway means disposed thereon and each of the shoe members includes a guide member attached thereto. The guide member is received in the guideway and cooperates therewith to prevent movement of the shoe members in a radial direction relative to the support means and to provide for relative movement in a direction parallel to the axis of rotation between the shoe members and the support means to thereby infinitely vary the width of the tire building surface.

Still another provision of the present invention is to provide a new and improved annular tire building drum having an infinitely variable width including a hub portion supportable about an axis of rotation and an annular fluid expandable tube element supported on the hub portion. The tube element includes support means disposed thereon. A plurality of pairs of shoe members are supported by the support means for movement therewith upon expansion and contraction of the tube element. The shoe members define an annular tire building surface which is movable in a radial direction upon expansion and contraction of the tube element. Piston means is supported by the hub portion and effects movement of one of the shoe members of each pair of shoe members in a first direction parallel to the axis of rotation and effects movement of the other of the shoe members in a direction opposite to the first direction to enable various width tires to be built on the variable width building surface. The support means includes guideway means and each of the shoe members include a guide member. The guide members are received in guideway means and prevent movement of the shoe members in a radial direction relative to the support means and provide for relative movement in a direction parallel to the axis of rotation between the shoe members and the support means to thereby infinitely vary the width of the tire building surface.

DESCRIPTION OF THE DRAWINGS

FIG. 1a and 1b are sectional side views of the present invention illustrating the fluid element in its expanded condition and the pistons in their contracted position in the upper part of the figure above the axis of rotation and illustrating the fluid element in its contracted condition and the pistons in their expanded condition in the lower portion of the figure below the centerline.

FIGS. 2a and 2b are side views taken approximately along lines 2—2 of FIG. 1.

FIG. 3 is a fragmentary sectional view taken approximately along the lines 3—3 of FIG. 1 more fully illustrating the guideway and guide members.

DESCRIPTION OF THE PREFERRED EMBODIMENT

Referring to the figures, a tire building drum 10 is illustrated. The tire building drum 10 is adaptable to be supported for rotation upon a shaft 12 about an axis of rotation 36 in a tire building machine, not illustrated, in a well-known manner. When the drum 10 is supported in a tire building machine, portions of tires can be built thereon as is well known.

The drum 10 includes a hub portion 14 which is secured to the shaft 12 for rotation therewith. Secured to the hub 14 is an annular tube element 16. The annular tube element 16 has a construction such as that more fully disclosed in application Ser. No. 813,151, assigned to the assignee of the present invention and which is incorporated by reference herein. The annular tube element 16 includes an exterior surface 18 on which a plurality of lugs 20 are disposed.

Each of the lugs 20 includes a cylindrical opening 22 therein which is disposed parallel to the axis of rotation 36. Straddling each lug 20 is support means in the form of a support block 24. Each support block 24 includes a channel-shaped opening 26 which is adapted to straddle an individual lug 20 of the tube element 16. A pair of axially aligned cylindrical openings 28 are disposed in each support block 24 and are adapted to be aligned with the cylindrical opening 22 in the lug 20 when the support block 24 straddles the lug 20 as is shown in FIG. 1. A pin member 30 is adapted to be simultaneously received in the openings 28 and 22 to secure the support block 24 to the lug 20 for movement therewith. A pair of snap rings 32 are disposed on each end of the pin member 30 to securely lock the pin 30 in the openings 28 and 22. A pair of guideways 34, illustrated in FIG. 3, are disposed on the sides of the support block 24. The guideways 34 extend substantially along the entire length of the support block 24 in a direction parallel to the axis of rotation 36 of the drum 10. The function of the guideways 34 will be more fully described hereinbelow.

A plurality of shoe members 40 are in part supported by the support blocks 24 and define a tire building surface 46 upon which portions of tires may be built. The plurality of shoe members 40 are arranged in pairs of shoe members 42 and 44. Each of the shoe members 42 and 44 is provided with a pattern, partially illustrated in FIG. 3, of alternating fingers and slots extending parallel to the axis of rotation 36 of the drum 10 and arranged so as to interdigitate with the slots and fingers of the corresponding axially aligned shoe member with which it is paired. This arrangement provides for axial movement of the pairs of shoe members 42, 44 in a direction parallel to the axis of rotation 36 of the drum 10 to thereby vary the width of the building surface 46.

Each of the shoe members 42 includes a pair of guide members 47 attached thereto for movement therewith and each of the shoe members 44 includes a pair of guide members 48 attached thereto for movement therewith, as is illustrated in FIG. 3. The guide members 47 and 48 are adapted to be located in the guideways 34 of the support block 24. The guideways 34 support the shoe members 42 and 44 in a fixed radial position relative to the lug members 20 on the tube elements 16. To this end, the guideways 34 cooperate with the guide members 47 and 48 to prevent movement in a radial direction of the shoe members 42 and 44 relative to the lugs 20 while providing for movement of the shoe members 42 and 44 in a direction parallel to the guideways 34 and the axis of rotation 36.

A plurality of pairs of piston members 50 and 52 are disposed in axial bores 54 and 56, respectively, located in the hub portion 14. Each of the pistons 50, 52 is attached at its outermost end to an end plate 58 by a bolt 60. The bolt 60 passes through an elongated slot 62 in the end plate 58 and is secured in a threaded opening 64 disposed on an end surface of the piston member. The end plates 58 are movable in a radial direction relative to the piston members 50, 52 upon expansion of the tube element 16. Expansion of the tube element 16 and the radial movement of the shoes 40 will provide for relative movement in a radial direction between the end plate 58 and the bolt 60.

Each of the shoe members 42 and 44 is secured via suitable bolts 66 to an end plate 58. It should be apparent that the end plates 58 and the respective shoes 42 and 44 which are attached thereto are movable with the pistons 50, 52 in a direction parallel to the axis of rotation 36 and movable in a radial direction relative to the pistons 50 and 52 upon expansion of the tube element 16 through a distance equal to the length of the slot 62. To this end each of the slots 62 includes an end surface 70 which is operable to engage with the bolt 60 to limit the outward radial movement of the end plate 58 and, hence, the respective shoe member 42, 44 attached thereto. Various resistors can be utilized in the end plates 58 to control the diameter of the building surface 46 when the tube element 16 is expanded. Additionally, a shoulder 57 is provided on piston 52 which engages with shoulder 59 on end plate 58 to fix the diameter of building surface 46 when the tube 18 is expanded. The shoulder 57 on the piston 52 limits outward radial movement of the end plate 58 and, hence, the diameter of building surface 46. The end plates 58 and the shoe members 40 are movable in a radial outward direction from the position shown in the lower portions of FIGS. 1 and 2 when the tube is contracted to the position shown in the upper portions of FIGS. 1 and 2 when the tube element 16 is expanded.

A source of pressurized fluid, not illustrated, such as air, is adapted to be connected to a bore 72 disposed coaxially in the shaft 12. The bore 72 is connected with a radially extending bore 74 which directs fluid flow from the bore 72 to a radially disposed bore 76 in the hub portion 14. The radially disposed bore 76 communicates with a valve 78 connected to the tube element 16 to effect expansion and contraction thereof. The radially disposed bore 76 additionally communicates with the bores 80, 82 which are operable to direct fluid into the bores 54 and 56, respectively, associated with pistons 50, 52.

When fluid pressure is directed from the source of fluid through the bore 72, it will be directed through the bores 74 and 76 and the valve 78 to the interior of the tube element 16 to effect expansion thereof. Expansion of the tube element 16 from its position shown in the bottom of FIGS. 1 and 2 to its position shown in the top of FIGS. 1 and 2 will effect radial movement of the shoe members 40 to the extent limited by the slot 62 and bolt 60. When pressurized fluid is directed to the tube element 16, it will also be directed from the bore 76 through bores 80, 82 to the interior of the bores 54 and 56 to bias the pistons 50 and 52, respectively, outwardly therefrom.

The outward movement of the pistons 50, 52 will be controlled by a plurality of stop bolts 84 to limit outward movement thereof. Each stop bolt 84 includes one end which is threadably received in an opening 86 in the hub 14 and an opposite head end 88 which is received in a stepped opening 90 disposed in its associated piston 50, 52. The opening 90 includes a first portion 91 having a diameter greater than the diameter of stop bolt 84 which allows the piston to slide relative to the bolt 84. The opening 90 further includes a stop surface 92 which is adaptable to engage with a stop surface 94 disposed on the head 88 of the bolt 84 to limit the outward movement of the piston relative to the stop surface 94. The stop bolt 84 is infinitely adjustable, such as by threading it into and out of the opening 86 to infinitely vary in a direction parallel to the axis of rotation the position of the stop surface 94 from a predetermined minimum position as illustrated in the upper portion of FIG. 1 to a predetermined maximum position as illustrated in the lower portion of FIG. 1. The stop bolt 84 controls the maximum outward movement of the piston relative to its associated bore between a predetermined minimum position and a predetermined maximum position determined by the position of the stop surface 94 of the stop bolt 84. Adjustment of the stop bolts 84 relative to the hub 14 allows the width of the building surface 46 to be infinitely varied to accommodate tires of various widths. Obviously, other linearly adjustable structures could be utilized to adjustably limit the outward movement of pistons 50, 52 to fix the width of the building surface.

A one-way check valve, not illustrated, is preferably disposed in the passageways 80, 82 between the bore 76 and the bores 54 and 56. The one-way check valve, not illustrated, enables the pistons 50, 52 to extend to their maximum predetermined position (as determined by stop bolt 84) the first time the tube element 16 is expanded by the introduction of pressurized fluid into passageways 72, 74, 76, 80 and 82. This will set the width of the building surface 46, as determined by the position of stop bolt 84, upon initial expansion of the tube element 16. When the tube element 16 is subsequently collapsed, the one-way check valve will prevent the exit of fluid from the bores 54 and 56 and, hence, the axial collapse of the pistons 50, 52 relative thereto. Thus, the subsequent collapse of the element 16 will allow the shoe members 42 and 44 to move in a radially inward direction relative to the axis of rotation 36 without effecting any movement of the shoe members 42, 44 in a direction parallel to the axis of rotation 36. Hence, the width of the building surface 46 will be set upon initial expansion of the tube element 16 and will remain at the set width until fluid is bled from bores 54, 56 which would allow the pistons 50,52 to move inwardly thereof. A relief valve, not illustrated, is provided in each of the bores 54 and 56 to allow fluid pressure to bleed therefrom and the pistons 50, 52 to move inwardly relative to their respective bores when the relief valve is opened. Ideally, the one-way check valve (not illustrated) will allow the pistons to assume their proper axial position relative to their respective bore upon initial expansion of the tube element 16 to thereby set the width of the building surface 46 and the relief valve (not illustrated) will be opened only when it is desired to change the width of the building surface 46. The one-way check valve will act to minimize fluid requirements by preventing repeated movement of the pistons 50, 52 every time fluid element 16 is expanded and contracted.

Each of the shoe members 42 and 44 includes a gap plate 98 attached thereto. Each gap plate 98 is secured to the exterior surface of the shoe member by the bolts 66. The gap plates 98 are thin plates of a ferromagnetic material which overlap to form a substantially continuous building surface 46. The gap plates 98 attach to each pair of shoes 42 and 44 overlap at the end portions thereof to provide a substantially continuous building surface over the interdigitated portion of the shoe members 42 and 44. Additionally, the gap plates 98 of adjacent shoe members 42 and adjacent shoe members 44 overlap along their sides to additionally provide a substantially continuous building surface 46 between adjacent pairs of shoe members 42, 44. Permanent magnets 100 are embedded in the shoes to pull down the ends and sides of the gap plate 98 to insure a continual building surface 46.

From the foregoing it should be apparent that a new and improved tire building drum having an infinitely variable axial width for building portions of tire having infinitely variable widths in a tire building machine has been provided. The tire building drum includes a hub portion supportable about an axis of rotation, an annular fluid expandable tube element supported on the hub portion and a plurality of pairs of shoe members supported by support means on the exterior surface of the tube element for movement therewith in a radial direction upon expansion and contraction of the tube element. The shoe members cooperate to define an annular tire building surface which is movable in a radial direction upon expansion and contraction of the tube element. The tire building surface has a width which is infinitely variable to provide for the building of various width tires thereon. Piston means are supported by the hub portion and the piston means are connected to the plurality of shoe members to effect movement of one of the shoe members of each of the pairs of shoe members in a first direction parallel to the axis of rotation of the drum and to effect movement of the other of the shoe members in a direction opposite the first direction to thereby infinitely vary the axial width of the tire building surface. Stop means are provided for limiting the axial movement of the shoe members. Each pair of shoe members is interdigitated to provide for movement of the shoe members relative to each other in a direction parallel to the axis of rotation of the drum. The support means includes a pluraltiy of guide blocks disposed on the exterior surface of the tube element and each of which includes a pair of guideways therein which are adapted to receive guide members therein which are disposed on the shoe members. The guideways and guide members cooperate to positively locate the shoe members in a radial direction relative the exterior surface of the tube element while allowing the shoe members to move relative to the tube element in a direction parallel to the axis of rotation to infinitely vary the width of the tire building surface.

We claim:

1. An annular tire building drum having an infinitely variable width for use in a tire building machine for building portions of tires having variable widths comprising a hub portion supportable for rotation in the tire building machine about an axis of rotation, an annular fluid expandable tube element supported on said hub portion, support means disposed on an exterior surface of said tube element for movement therewith, a plurality of pairs of shoe members supported by said support means for movement therewith in a radial direction upon expansion and contraction of said tube element, said shoe members cooperating to define an annular tire building surface which is movable in a radial direction upon expansion and contraction of said tube element, one of said shoe members of each of said plurality of pairs of shoe members being movable in a first direction parallel to said axis of rotation and the other of said shoe members of said plurality of pairs of shoe members being movable in a second direction opposite to said first direction to infinitely vary the axial width of the building surface to enable various width tires to be built thereon, said support means including guideway means disposed thereon, each of said shoe members including a guide member attached thereto for movement therewith, said guide members being received in said guideway means and cooperating therewith to prevent movement of said shoe members in a radial direction relative to said support means and the exterior surface of the tube element and providing for relative movement in a direction parallel to said axis of rotation between said shoe members and said support means to thereby infinitely vary the width of said tire building surface.

2. An annular tire building drum for use in a tire building machine for building portions of tires as defined in claim 1 wherein said exterior surface of said tube element includes an annular array of lug elements rigidly affixed thereto and movable therewith in a radial direction upon expansion and contraction of said tube element, said support means includes a plurality of support blocks, one of which is attached to each of said lug elements for movement therewith.

3. An annular tire building drum for use in a tire building machine for building portions of tires as defined in claim 2 wherein each of said support blocks includes a pair of axially aligned cylindrical openings therein and each of said lug elements includes a cylindrical opening therein, each of said support blocks being operable to straddle one of said lug elements with said opening in said lug element aligned with said pair of openings in said support block and further including a pin member simultaneously receivable in said aligned openings in said support block and said opening in said lug element to thereby affix said support block to said lug element for movement therewith.

4. An annular tire building drum for use in a tire building machine for building portions of tires as defined in claim 3 wherein said guideway means includes a pair of parallel guideway channels disposed in said support block substantially parallel to said axis of rotation of said drum member and each of said guide members of said shoe members extends in a direction parallel to said axis of rotation and is disposed within one of said guideway channels to thereby guide the movement of the shoe member relative to said support member in a direction parallel to the axis of rotation and prevent movement of the shoe member in a radial direction relative to said suppport block.

5. An annular tire building drum for use in a tire building machine for building portions of tires as defined in claim 1 wherein said guideway means includes a pair of parallel guideway channels disposed in said support block substantially parallel to said axis of rotation of said drum member and each of said guide members of said shoe members extends in a direction parallel to said axis of rotation and is disposed within one of said guideway channels to thereby guide the movement of the shoe member relative to said support member in a direction parallel to the axis of rotation and prevent movement of the shoe member in a radial direction relative to said support block.

6. An annular tire building drum for use in a tire building machine for building portions of tires as defined in claim 5 wherein each of said pairs of shoe members are interdigitated and movable parallel to said axis of rotation relative to each other to provide a tire building surface which is infinitely variable between a predetermined maximum and a predetermined minimum width.

7. An annular tire building drum for use in a tire building machine for building portions of tires as defined in claim 1 wherein each of said pairs of shoe members are interdigitated and movable parallel to said axis of rotation relative to each other to provide a tire building surface which is infinitely variable between a predetermined maximum and a predetermined minimum width.

8. An annular tire building drum having an infinitely variable width for use in a tire building machine for building portions of tires having variable widths comprising a hub portion supportable in the tire building machine for rotation about an axis of rotation, an annular fluid expandable tube element supported on said hub portion, support means disposed on an exterior surface of said tube element for movement therewith, a plurality of pairs of shoe members supported by said support means for movement therewith in a radial direction upon expansion and contraction of said tube element, said shoe members cooperating to define an annular tire building surface which is movable in a radial direction upon expansion and contraction of said tube element, piston means supported by said hub portion and being operatively associated with said shoe members, said piston means being movable in response to fluid acting thereon to effect movement of one of said shoe members of each pair of shoe members in a first direction parallel to said axis of rotation and to effect movement of the other of said shoe members of each of pair in a direction opposite to said first direction to infinitely vary the axial width of the tire building surface defined by said plurality of said shoe members to enable various width tires to be built on the variable width building surface, said support means including guideway means disposed therein, each of said shoe members including a guide member associated therewith, said guide members being received in said guideway means and cooperating therewith to prevent movement of said shoe member in a radial direction relative to said support means and the exterior surface of said tube element and providing for relative movement in a direction parallel to said axis of rotation between said shoe members and said support means to thereby infinitely vary the width of said tire building surface.

9. An annular tire building drum for use in a tire building machine for building portions of tires as defined in claim 8 further including an annular array of lug elements rigidly secured to the exterior surface of said tube element for movement therewith in a radial direction upon expansion and contraction of said tube element, each of said lug elements including a cylindrical opening therein disposed substantially parallel to said axis of rotation, said support means including a plurality of support blocks, each of said support blocks having a pair of axially aligned cylindrical openings therein, each of said support blocks being operable to straddle one of said lug members with said opening in said lug member being aligned with said pair of openings in said support block and further including a pin member simultaneously receivable in said aligned openings in said support block and said opening in said lug element to thereby affix said support member to said lug element for movement therewith in a radial direction.

10. An annular tire building drum for use in a tire building machine for building portions of tires as defined in claim 9 wherein said guideway means includes a pair of parallel guideway channels disposed in said support block substantially parallel to said axis of rotation and each of said guide members of said shoe members extends in a direction parallel to said axis of rotation and is disposed within one of said guideway channels to thereby guide movement of the shoe member relative to said support member in a direction parallel to the axis of rotation and prevent somewhat of the shoe member in a radial direction relative to said suppport block.

11. An annular tire building drum for use in a tire building machine for building portions of tires as defined in claim 8 wherein said guideway means includes a pair of parallel guideway channels disposed in said support means substantially parallel to said axis of rotation of said drum member and each of said guide members of said shoe members extends in a direction parallel to said axis of rotation and is disposed within one of said guideway channels to thereby guide movement of the shoe members relative to said support means in a direction parallel to the axis of rotation and prevent movement of the shoe member in a radial direction relative to said suppport means.

12. An annular tire building drum for use in a tire building machine for building portions of tires as defined in claim 10 wherein each of said pairs of shoe members are interdigitated and movable parallel to said axis of rotation relative to each other to provide a tire building surface which is infinitely variable between a predetermined maximum and a predetermined minimum width.

13. An annular tire building drum for use in a tire building machine for building portions of tires as defined in claim 11 wherein each of said pairs of shoe members are interdigitated and movable parallel to said axis of rotation relative to each other to provide a tire building surface which is infinitely variable between a predetermined maximum and a predetermined minimum width.

14. An annular tire building drum for use in a tire building machine for building portions of tires as defined in claim 8 wherein said piston means includes a plurality of pairs of piston members, each pair of piston members being movable in a direction parallel to said axis of rotation and being associated with one of said plurality of pairs of shoe members, each pair of piston members including one piston member operatively connected to said one shoe member of a pair and the other piston member operatively connected to said other shoe member of the pair, said one piston being operable to effect movement of said one shoe member in said first direction and said other piston being operable to effect movement of said other shoe member in a direction opposite said first direction.

15. An annular tire building drum for use in a tire building machine for building portions of tires as defined in claim 14 further including a plurality of end plate members each of which is connected to one of said piston members and to one of said shoe members for movement therewith in a direction parallel to said axis of rotation to effect movement of said shoe member in a direction parallel to the axis of rotation in response to movement of said piston member.

16. An annular tire building drum for use in a tire building machine for building portions of tires as defined in claim 15 further including interconnecting means interconnecting each of said piston members and said associated end plate members, said interconnecting means preventing movement of said end plate member and said associated shoe member relative to said piston means in a direction parallel to said axis of rotation and allowing movement between said end plate member and said associated shoe member relative to said piston means in a radial direction.

17. An annular tire building drum for use in a tire building machine for building portions of tires as defined in claim 16 wherein said interconnecting means includes a stop surface thereon for limiting radial movement of said end plate and said associated shoe member in a radial direction in response to expansion of said tube element to positively control the diameter of said building surface.

18. An annular tire building drum having an infinitely variable width for use in a tire building machine for building portions of tires having variable widths comprising a hub portion supportable for rotation in the tire building machine about an axis of rotation, fluid expandable tube means supported on said hub portion, a plurality of pairs of shoe members supported for movement in a radial direction upon expansion and contraction of said tube means, said shoe members cooperating to define an annular tire building surface which is movable in a radial direction upon expansion and contraction of said tube means, one of said shoe members of each of said plurality of pairs of shoe members being movable in a first direction parallel to said axis of rotation and the other of said shoe members of said plurality of pairs of shoe members being movable in a second direction opposite to said first direction to infinitely vary the axial width of the building surface to enable various width tires to be built thereon, guide means supported for movement in a radial direction upon expansion and contraction of said tube means, one of said guide means and said pairs of shoe members including guideway means disposed thereon and the other of said guide means and said pairs of shoe members including a guide member movable therewith, said guide members being received in said guideway means and cooperating therewith to prevent movement of said shoe members in a radial direction relative to said guide means and providing for relative movement in a direction parallel to said axis of rotation between said shoe members and said guide means to thereby infinitely vary the width of said tire building surface.

* * * * *